United States Patent [19]

Sugiyama et al.

[11] Patent Number: 4,573,092

[45] Date of Patent: * Feb. 25, 1986

[54] ROTARY RECORDING MEDIUM REPRODUCING APPARATUS

[75] Inventors: Hiroyuki Sugiyama, Isehara; Masaki Sakurai; Ryozo Abe, both of Yokohama; Yasuhiro Yusa, Fujisawa; Kenji Yoshihara, Chiba; Takashi Saito, Ayase, all of Japan

[73] Assignee: Victor Company of Japan, Ltd., Yokohama, Japan

[ * ] Notice: The portion of the term of this patent subsequent to Nov. 1, 2000 has been disclaimed.

[21] Appl. No.: 388,142

[22] Filed: Jun. 14, 1982

[30] Foreign Application Priority Data

Jun. 15, 1981 [JP] Japan ................... 56-91918

[51] Int. Cl.$^4$ .................. G11B 5/82; G11B 19/10
[52] U.S. Cl. ..................... 360/97; 360/133; 360/137; 369/77.2
[58] Field of Search ............ 369/77.1–77.2; 360/86, 97, 99, 133, 137

[56] References Cited

U.S. PATENT DOCUMENTS

| | | | |
|---|---|---|---|
| 3,662,360 | 5/1972 | Lambert | 360/97 X |
| 3,949,425 | 4/1976 | Perret et al. | 360/137 |
| 4,380,780 | 5/1983 | Hirata et al. | 360/97 |
| 4,380,781 | 5/1983 | Hirata | 360/97 |
| 4,413,299 | 11/1983 | Sugiyama et al. | 360/137 |
| 4,443,872 | 4/1984 | Kirschner | 369/77.2 |
| 4,454,599 | 6/1984 | Tsuchiya | 369/77.2 |

FOREIGN PATENT DOCUMENTS 1104206  4/1961  Fed. Rep. of Germany .
2417163  2/1979  France .

Primary Examiner—Stuart N. Hecker
Assistant Examiner—David J. Severin
Attorney, Agent, or Firm—Louis Bernat

[57] ABSTRACT

A rotary recording medium reproducing apparatus comprises a holding mechanism for clamping and holding a lid plate and a rotary recording medium when a case having a jacket accommodating therein the rotary recording medium and the lid plate for closing the jacket is inserted into the reproducing apparatus through an inserting opening, where the lid plate and the rotary recording medium thus clamped and held are recovered within an empty jacket inserted through the inserting opening, a control mechanism for putting the reproducing apparatus in a state possible or not to insert the case or the jacket into the reproducing apparatus through the inserting opening, a detection circuit for detecting whether the rotary recording medium exists within the reproducing apparatus, a single load/eject switch, and a control circuit for controlling the control mechanism by use of a detection output of the detection circuit and an output of the load/eject switch, so that a state possible for inserting the case into the reproducing apparatus is obtained when the rotary recording medium does not exist within the reproducing apparatus, and a state possible for inserting the empty jacket into the reproducing apparatus is obtained when the rotary recording medium does exist within the reproducing apparatus in order to enable recovery of the rotary recording medium.

5 Claims, 5 Drawing Figures

ROTARY RECORDING MEDIUM REPRODUCING APPARATUS

BACKGROUND OF THE INVENTION

The present invention generally relates to rotary recording medium reproducing apparatuses, and more particularly to a rotary recording medium reproducing apparatus which can be put into a state possible for inserting a rotary recording medium into the reproducing apparatus and put into a state possible for recovering the rotary recording medium from the reproducing apparatus, by the manipulation of a single switch.

Conventionally, disc cases constructed to accommodate a rotary recording medium (hereinafter simply referred to as a disc) within a jacket and having a lid member for closing an opening of the jacket, in order to protect the disc from scratches, dirt, dust particles, and the like, have been proposed and reduced to practical use. A reproducing apparatus for reproducing a disc by operating together with the above type of a disc case, is constructed so that the disc is clamped and left at a predetermined position inside the reproducing apparatus by an operation in which the disc case accommodating the disc therein is inserted into and then pulled out from the reproducing apparatus. The disc left inside the reproducing apparatus is recovered within the case by an operation in which the empty disc case is inserted into and then pulled out from the reproducing apparatus.

In the above described type of a reproducing apparatus, the operator can reproduce a disc without directly handling the disc. However, since the above disc case is inserted into and pulled out of the reproducing apparatus through a long and narrow opening in the reproducing apparatus, the operator cannot see the inside of the reproducing apparatus from the outside. Thus, the operational state inside the reproducing apparatus cannot be visually detected directly. Therefore, it becomes necessary to prevent erroneous operations from being performed. That is, operations in which an attempt is made to insert a disc into the reproducing apparatus in a state where another disc is already inside the reproducing apparatus, and attempt is made to recover the disc when the reproducing apparatus is in a state where the disc cannot be recovered, must be prevented from being performed.

SUMMARY OF THE INVENTION

Accordingly, it is a general object of the present invention to provide a novel and useful rotary recording medium reproducing apparatus in which the above described demands have been satisfied.

Another and more specific object of the present invention is to provide a rotary recording medium reproducing apparatus constructed so that the reproducing apparatus can be put into a state possible for inserting a rotary recording medium when another rotary recording medium does not exist inside the reproducing apparatus, and put into a state possible for recovering the rotary recording medium when a rotary recording medium exists inside the reproducing apparatus, by the manipulation of a single switch. According to the apparatus of the present invention, the apparatus can be put into the state where the rotary recording medium can be inserted (loading state) and put into the state where the rotary recording medium can be recovered (ejecting state), by requiring only a simple manipulation of a load/eject switch. This enables reduction in size and weight of the apparatus, and the manipulation panel can be simply constructed.

Other objects and further features of the present invention will become apparent from the following detailed description when read in conjunction with the accompanying drawings.

DETAILED DESCRIPTION

Figure 1:
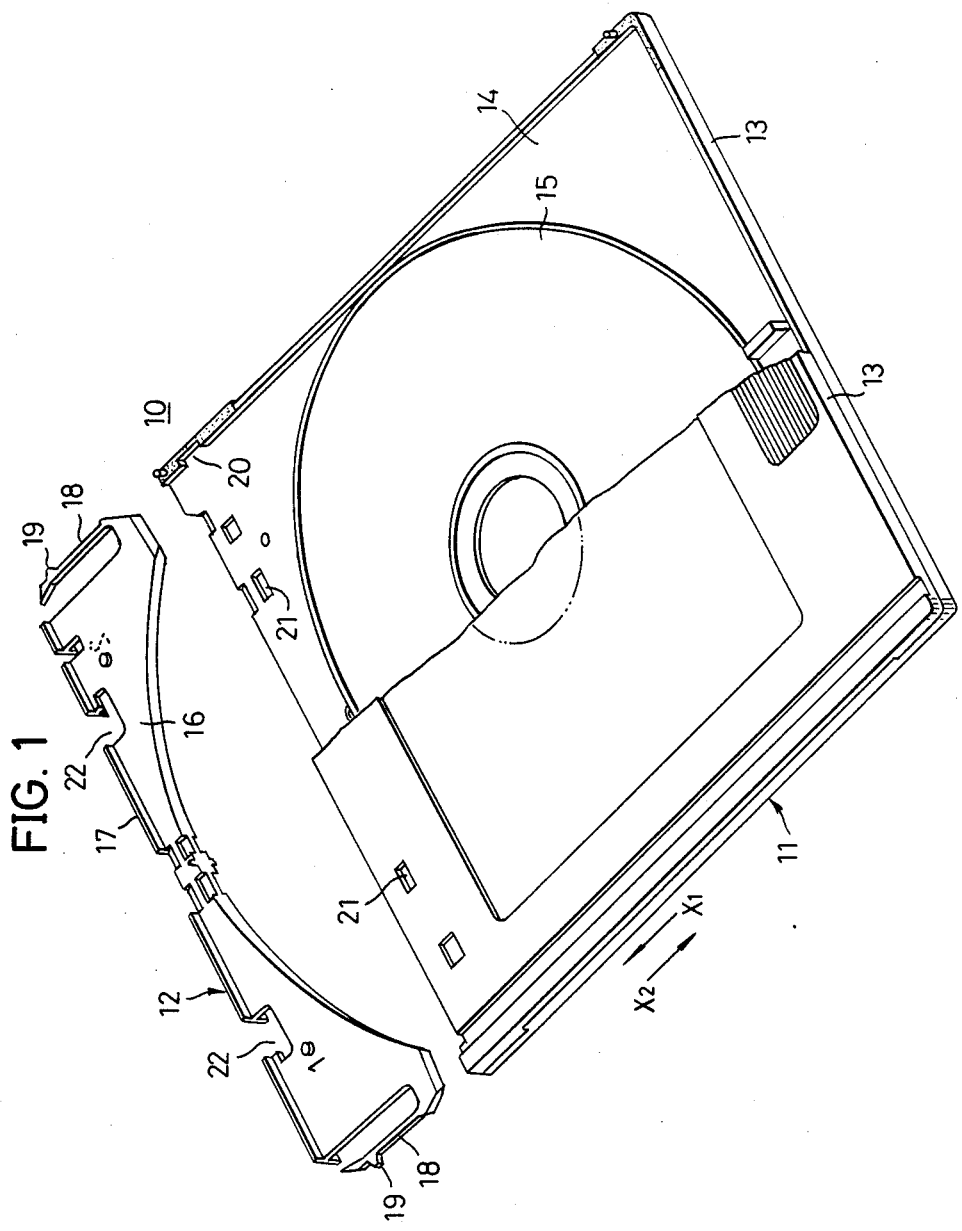
FIG. 1 is a perspective view, with a part cut away, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13 and 13, and comprises a flat cavity or space 14 therein. This space 14 acommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
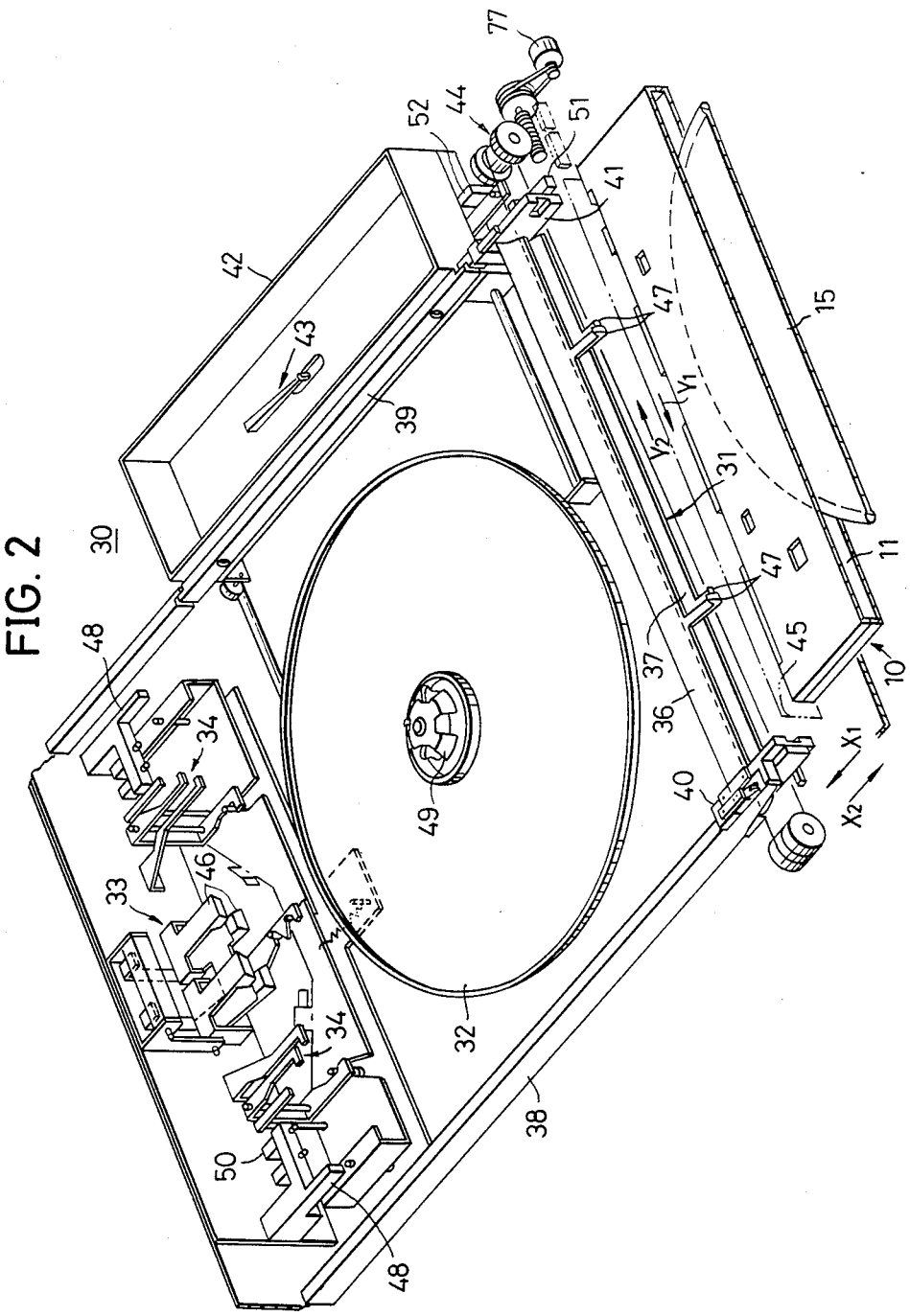
FIG. 2 is a diagram showing an essential part of an embodiment of a rotary recording medium reproducing apparatus according to the present invention in a state where an outer casing of the reproducing apparatus is omitted.

As shown in FIG. 2, a reproducing apparatus 30 substantially comprises a jacket opening enlarging mechanism 31, a turntable 32 for rotating the disc 15 placed thereon, a disc holding mechanism 33 for clamping the disc 15, a lid plate locking mechanism 34 for locking the lid plate 12, and the like.

The jacket opening enlarging mechanism 31 comprises upper and lower beams 36 and 37 extending in the directions of arrows Y1 and Y2, and the supporting members (sliders) 40 and 41 which are respectively fixedly inserted into the guide rails 38 and 39, to support both ends of the respective beams 36 and 37.

A pickup frame 42 is provided with a pickup device 43 including a reproducing stylus, and is transferred towards the directions of the arrows Y1 and Y2 by a transferring mechanism 44.

The disc holding mechanism 33 is provided at the innermost part of the reproducing apparatus 30, on the opposite side from an inserting opening 45, and comprises a pair of upper and lower holding fingers 46.

Upon reproduction of the disc 15, the disc case 10 is inserted through the inserting opening 45 of the reproducing apparatus 30, by inserting the disc case 10 with the side of the lid plate 12 first, into the direction of an arrow X1. When the jacket opening enlarging mechanism 31 is pushed and moved in the direction of the arrow X1 by the disc case 10, the enlarging mechanism 31 moves, the upper and lower beams 36 and 37 rotate angularly, and enlarging fingers 47 thus respectively move in directions so as to mutually separate from each other. Accordingly, the tip ends of the enlarging fingers 47 engage with engaging windows 21 of the jacket 11, and enlarge the front part of the upper and lower jacket halves 13 upwards and downwards, to enlarge the opening.

When the disc case 10 is inserted into the innermost part of the reproducing apparatus 30 together with the enlarging mechanism 31, by passing above the turntable 32, cutouts 22 of the lid plate 12 are locked by the lid plate locking mechanism 34. Hence, the lid plate 12 is locked and held at the innermost part of the reproducing apparatus 30.

Furthermore, engagement releasing members 48 enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 46.

Next, the jacket 11 is pulled out in the direction of an arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from the jacket 11. The disc 15 is supported horizontally directly above the turntable 32 by the holding fingers 46 and a disc clamping mechanism 49 which is in a raised position, in a state where the jacket 11 is completely pulled out from the reproducing apparatus 30.

Figure 3:
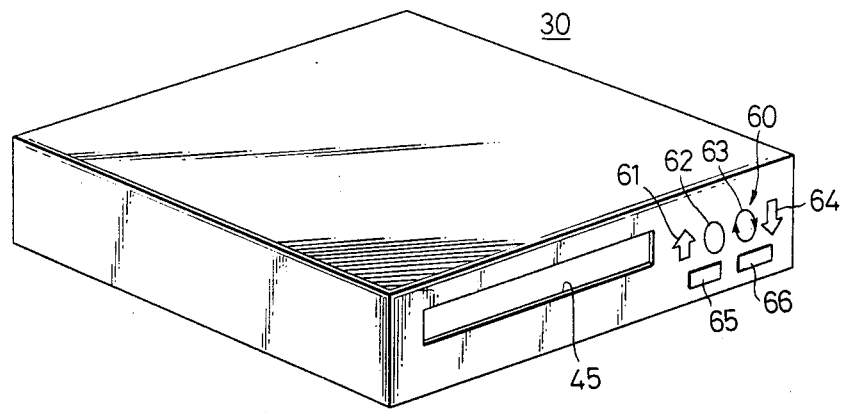
FIG. 3 is an outer perspective view showing an example of an outer casing of the rotary recording medium reproducing apparatus.

When a start button 65 shown in FIG. 3 is pushed, the disc holding mechanism 33 releases the holding operation, and the disc clamping mechanism 49 is lowered. The disc 15 is lowered onto the turntable 32, and rotated clockwise. Further, the pickup frame 42 moves in the direction of the arrow Y1 from a waiting position, and the disc 15 is relatively scanned by the reproducing stylus of the pickup device 43, to reproduce the information signal.

Next, an operation in which the disc 15 is recovered from within the reproducing apparatus 30, will now be described.

Upon completion of the reproducing operation, the disc clamping mechanism 49 is raised to push the disc 15 upwards. In addition, the holding fingers 46 hold the disc 15 which is at a pushed-up position.

When the jacket 11 is inserted into the innermost position inside the reproducing apparatus 30, the disc 15 becomes completely incased within the jacket 11, and furthermore, the locked lid plate 12 is relatively inserted within the opening of the jacket 11.

As the jacket 11 is inserted into the final position, the disc 15 becomes accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

A lid plate lock detection switch 50 is provided at the innermost part of the reproducing apparatus 30, in the vicinity of the lid plate locking mechanism 34. The lid plate lock detection switch 50 is closed when pushed by the lid plate 12 upon insertion of the lid plate 12 into the innermost part of the reproducing apparatus 30 together with the jacket 11. Moreover, the lid plate lock detection switch 50 is closed during the time when the lid plate 12 is locked. Accordingly, the lid plate lock detection switch 50 opens when the lid plate 12 separates from the lid plate locking mechanism 34 upon recovering of the lid plate within the jacket 11 together with the disc 15, by inserting an empty jacket 11 into the reproducing apparatus. Furthermore, a detection switch 51 is provided at a position so as to operate together with the slider 41, and the insertion of the jacket 11 can be detected due to the opening (or closing) of the detection switch 51 when the slider 41 is operated by inserting the jacket 11 through the inserting opening 45. In addition, a detection switch 52 is also provided in the reproducing apparatus, where the detection switch 52 is opened (or closed) when the pickup frame 42 is at a resting position shown in FIG. 2. The detection switch 52 is closed (or opened) when the pickup frame 42 is not at the resting position, to detect that the pickup frame 42 is not at the resting position. Although not shown in FIG. 2, a switch 53 (shown in FIG. 4) is further provided below the turntable 32, to detect the raising or lowering states of the disc clamping mechanism 49.

Figure 4:
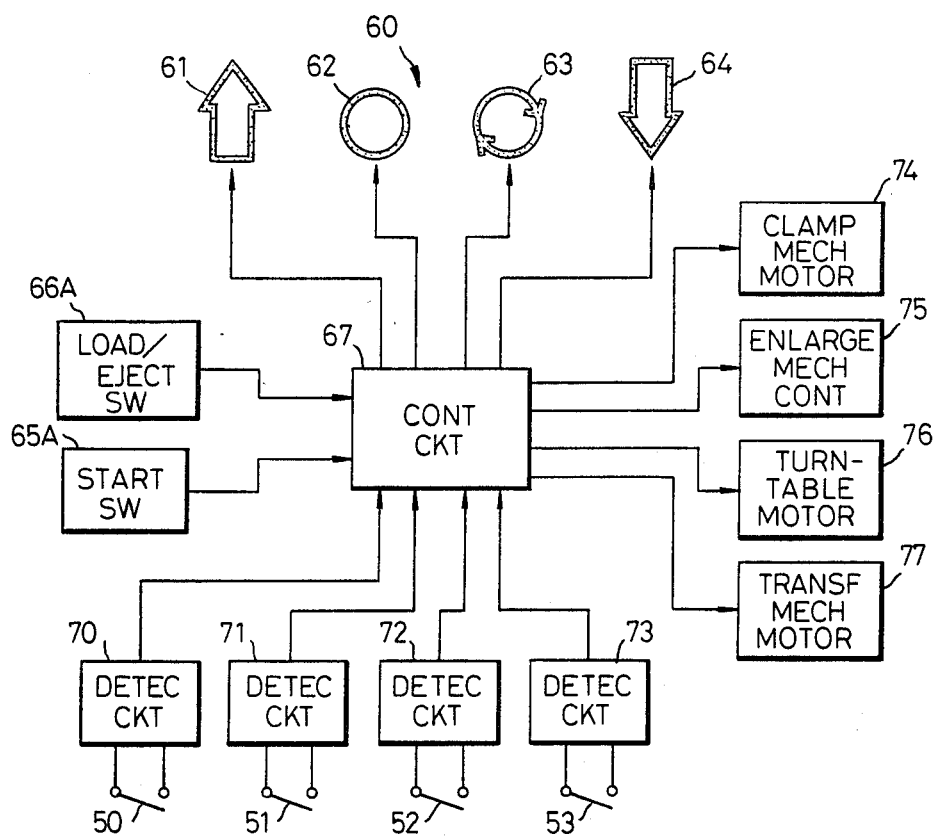
FIG. 4 is a systematic block diagram showing an embodiment of a rotary recording medium reproducing apparatus according to the present invention.

Next, description will be given with respect to the operation of an embodiment of a reproducing apparatus according to the present invention, by referring to FIGS. 2 through 4. In a state before the disc case 10 is inserted into the reproducing apparatus 30, the detection switch 50 is open. Accordingly, a lid plate lock detection circuit 70 does not detect the locking of the lid plate 12.

When the disc case 10 is to be inserted into the reproducing apparatus 30 upon reproduction of the disc 15, it is first necessary to check whether the reproducing apparatus 30 is in a state where the disc case 10 can be inserted thereto. When a load/eject button 66 is pushed in this state, a load/eject switch 66A becomes closed. A closing signal from the load/eject switch 66A is supplied to a control circuit 67, and the control circuit 67 operates a motor 74 for the disc clamping mechanism. Hence, the disc clamping mechanism 49 is raised, and the detecton switch 53 becomes closed, to produce an output from a clamping mechanism position detection circuit 73. The load/eject button 66 and the load/eject switch 66A are constructed so that the switch is in the closed state when pushed, and in the open state when released.

The control circuit 67 produces a loading indication signal according to the open state of the switch 66A, the detected output of the detection circuit 73, and the result obtained when the detection circuit 70 has not detected the locking of the lid plate. The loading indication signal is supplied to an indication element 61 in an indicator 60. The indication element 61 is an arrow facing upwards, for example, and is illuminated by the application of the above loading indication signal to indicate a loading state possible for inserting the disc. It is thus indicated that the disc case 10 can be inserted into the reproducing apparatus in this state. In addition, a signal is supplied to a control circuit 75 for the jacket opening enlarging mechanism from the control circuit 67, to put the jacket opening enlarging mechanism 31 is a state possible for performing the enlarging operation.

Next, when the disc case 10 is inserted into the inner part of the reproducing apparatus 30 through the inserting opening 45, the jacket opening enlarging mechanism 31 operates as described above. Therefore, when the slider 41 moves, the detection switch 51 operates to produce an output signal from a detection circuit 71. This output signal of the detection circuit 71 is supplied to the above control circuit 67. As the disc case 10 is inserted into the innermost part of the reproducing apparatus 30 and the lid plate 12 is locked by the lid plate locking mechanism 34, the detection switch 50 becomes closed. Accordingly, the detection circuit 70 detects that the lid plate 12 is in a locked state, and supplies an output signal to the control circuit 67.

The disc 15 is left inside the reproducing apparatus 30 in a state where the disc 15 is held by the above lid plate 12 and the disc holding mechanism 33, when the jacket 11 is pulled out from the reproducing apparatus 30. When the empty jacket 11 is pulled outside the inserting opening 45, the detection circuit 71 detects that the jacket 11 has moved outside the reproducing apparatus 30. Thus, the control circuit 67 operates the motor 74 for the clamping mechanism, to lower the disc clamping mechanism 49 and place the disc 15 onto the turntable 32. The control circuit 67 produces a signal for indicating a state possible for reproduction (reproduction stand-by state), by detecting that the lid plate lock detection signal from the detection circuit 70 exists, that the signal from the detection circuit 71 does not exist, and that the pickup frame 42 which is being detected by a detection circuit 72 is in the resting position. The above signal for indicating the reproduction stand-by state is supplied to drive and illuminate a reproduction stand-by indication element 62 of a ring shape, to indicate the reproduction stand-by state. At this point, the control circuit 67 simultaneously clears the indication on the indication element 61.

Next, when the start button 65 is pushed to start reproduction, a start switch 65A becomes closed, to supply a signal to the control circuit 67. Thus, the reproducing apparatus 30 is put into a state possible for performing reproduction. The control circuit 67 operates a motor 76 for the turntable, and rotates the turntable 32. The control circuit 67 also operates a motor 77 for the transferring mechanism. Hence, the pickup frame 42 is transferred towards the direction of the arrow Y1 from the resting position. The pickup frame 42 reaches a position above the disc 15, and the pickup device 43 reproduces the signal recorded on the disc 15. Here, the detection circuit 72 detects that the pickup frame 42 is not at the resting position by the switch 52. The control circuit 67 clears the indication on the indication element 62, and supplies a reproducing state indication signal to a ring-shaped reproducing state indication element 63. Thus, the indication element is illuminated to indicate that the reproducing apparatus is in the reproducing state. Accordingly, the indication at the indicator 60 is changed from the reproduction stand-by indication to the reproducing state indication. In addition, the control circuit 67 supplies an output signal to the control circuit 75 for the enlarging mechanism, so that the enlarging mechanism 31 cannot operate. This puts the reproducing apparatus in a state where the disc case cannot be inserted thereto. Because the pickup frame 42 is not at the resting position during modes such as the so-called pause mode in which the reproducing operation is once interrupted by temporarily stopping the transferring operation of the pickup frame 42, and the so-called search mode in which the pickup frame 42 is transferred at a high speed to search for a desired reproduction starting position, the indication on the indication element 63 remains in these states.

When the reproduction of the disc 15 is completed and the pickup frame 42 is transferred towards the direction of the arrow Y2 to be returned to the resting position, the detection circuit 72 detects that the pickup frame 42 has returned to the resting position by the switch 52. Hence, the control circuit 67 clears the indication on the indication element 63, and again illuminates the indication element 62. Therefore, the indication on the indicator 60 is changed from the reproducing state indication to the reproduction stand-by indication.

In order to recover the disc 15, the load/eject button 66 is pushed, to check whether it is possible to recover the disc 15. By performing this operation, the switch 66A becomes closed, and the control circuit 67 operates the motor 74. Accordingly, the disc clamping mechanism 49 rises to raise the disc 15 to a height position where the disc 15 can be recovered by the jacket 11. Therefore, the detection circuit 73 detects that the disc 15 is in the raised state by the detection detection switch 53. At this point, the lid plate 12 remains in the locked state, and the switch 50 remains closed. Thus, the control circuit 67 clears the indication on the indication element 62, and supplies a signal indicating the state possible for recovering the disc to a disc recovery state indication element 64. This indication element 64 is an arrow facing downwards, and is illuminated by the above signal from the control circuit 67. Accordingly, the indication on the indicator 60 is changed from the reproduction stand-by indication to the disc recovery state indication. In addition, the control circuit 67 stops the rotation of the turntable motor 67.

When the empty jacket 11 is inserted through the inserting opening 45, to recover the disc 15 and the lid plate 12 as the jacket 11 is pulled out from the reproducing apparatus 30 as described above, the switch 50 becomes open. In this case, it is only possible to insert the empty jacket 11. Moreover, the switch 51 detects that the slider 41 has returned to the original position, and the control circuit 67 clears the indication on the indication element 64.

If the load/eject button 66 is pushed when the above described reproduction of the disc 15 is to be carried out, the disc clamping mechanism 49 rises. The jacket opening enlarging mechanism 31 is thus put into a state possible for performing the enlarging operation, and the loading state possible for inserting the disc case is indicated. Thereafter, when the load/eject button 66 is pushed without inserting the disc case 10 into the reproducing apparatus 30, the motor 74 is operated by the control circuit 67 to lower the disc clamping mechanism 49. The enlarging mechanism control circuit 75 then puts the enlarging mechanism 31 into a state where the enlarging operation cannot be performed. Thus, the indication on the indication element 61 becomes cleared, and the reproducing apparatus is returned to the original state.

After the reproduction of the disc is completed and the disc 15 is recovered within the jacket 11, the reproducing apparatus 30 will remain in the state where only the jacket 11 with the lid plate 12 can be inserted thereto again if the reproducing apparatus is left in this state. Accordingly, it is possible to proceed and reproduce another disc without carrying out additional manipulation.

Figure 5:
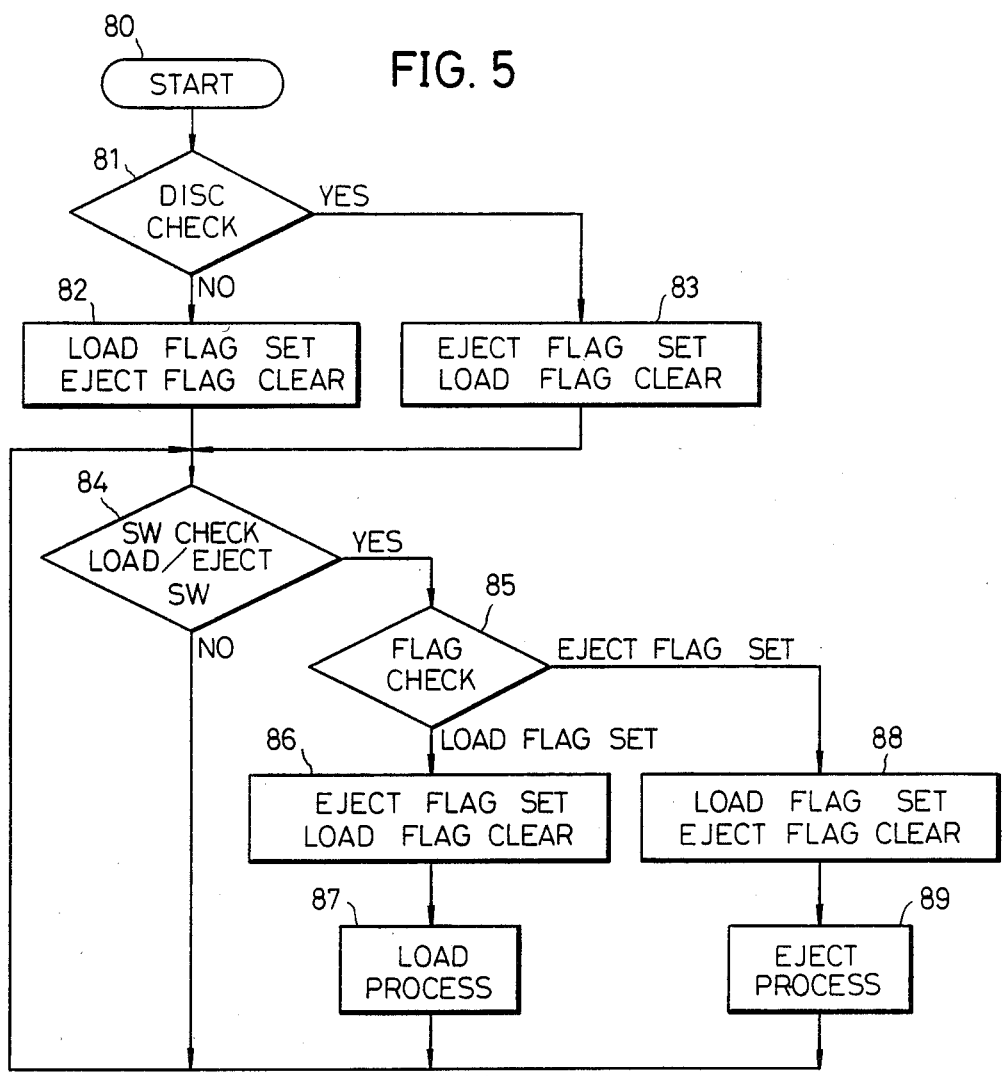
FIG. 5 is a flow chart for explaining the operation in a case where a control circuit in the block system shown in FIG. 4 is constructed from a micro-computer.

The above control circuit 67 may be constructed from a micro-computer, and the operation in such a case is shown in the flow chart of FIG. 5. The operation is started at a step 80, and a check is performed at a step 81 to detect whether a disc exists within the reproducing apparatus. If there is no disc inside the reproducing apparatus, a load flag is set and an eject flag is cleared at a step 82. On the other hand, if a disc does exist within the reproducing apparatus, an eject flag is set and a load flag is cleared at a step 83. Checking with respect to the switch detection output and the load/eject switch are performed at a step 84. If the result of the checking is NO at the step 84, the checking is continued until the result of the checking becomes YES. When the result from the step 84 becomes YES, the load or eject flag is checked at a succeeding step 85. If the set load flag is checked, the eject flag is set and the load flag is cleared at a step 86, to perform a loading process at a step 87. On the other hand, if the set eject flag is checked at the step 85, the load flag is set and the eject flag is cleared at a step 88, to perform an ejecting process at a step 89.

Further, the present invention is not limited to these embodiments, but various variations and modifications may be made without departing from the scope of the present invention.

What is claimed is:

1. A reproducing apparatus for playing a rotary recording medium, said reproducing apparatus comprising:
holding means for clamping and holding a lid plate and a rotary recording medium when a case having a jacket is inserted into the reproducing apparatus via an inserting opening, said jacket accommodating therein the rotary recording medium and having the lid plate for closing said jacket, said clamped and held lid plate and said rotary recording medium being recovered within an empty jacket are inserted through said inserting opening;
a control mechanism for putting said reproducing apparatus in an insertable or a non-insertable state, said case or said jacket being insertable into said reproducing apparatus through the inserting opening when said control mechanism causes said insertable state and being non-insertable when said control mechanism causes said non-insertable state;
detection means for detecting whether or not said rotary recording medium is within said reproducing apparatus;
a single load eject switch; and
a control circuit for controlling said control mechanism responsive to a detection output of said detection means and to an output of said load/eject switch, so that said case is insertable into the reproducing apparatus when said rotary recording medium is not within the reproducing apparatus and said empty jacket is insertable into the reproducing apparatus when said rotary recording medium is within the reproducing apparatus in order to enable a recovery of said rotary recording medium.

2. A reproducing apparatus as claimed in claim 1 further comprising lid plate locking means for locking the lid plate inserted into said reproducing apparatus, rotary recording medium holding means for holding the rotary recording medium inserted into said reproducing apparatus together with said case, clamping means for clamping said rotary recording medium and lowering and raising said rotary recording medium between a position where the rotary recording medium is held by said rotary recording medium holding means and a position on a turntable where the rotary recording medium is placed thereon and rotated, and reproducing means transferred over said rotary recording medium for reproducing recorded signals from the rotary recording medium, said detection means comprising a first switch for detecting that said lid plate locking means is locking said lid plate, a second switch provided in the vicinity of the inserting opening of said reproducing apparatus for detecting the insertion of said case or said jacket, a third switch for detecting that said reproducing means is at a resting position other than a position over said rotary recording medium, and a fourth switch for detecting the downward or upward movement of said clamping means which lowers and raises said rotary recording medium.

3. A reproducing apparatus as claimed in claim 1 in which said control circuit controls said control mechanism so that the insertion of the empty jacket becomes possible, when said load/eject switch is manipulated in a state where said rotary recording medium exists within said reproducing apparatus.

4. A reproducing apparatus as claimed in claim 1 in which said control circuit controls said control mechanism so that the insertion of said case becomes possible, when said load/eject switch is manipulated in a state where said rotary recording medium does not exist within said reproducing apparatus.

5. A reproducing apparatus as claimed in claim 4 in which said control circuit controls said control mechanism so that the insertion of said case becomes impossible, when said load/eject switch is manipulated once in a state where said rotary recording medium does not exist within said reproducing apparatus and then manipulated for a second time in this state.

* * * * *